United States Patent [19]
Primus

[11] Patent Number: 5,495,814
[45] Date of Patent: Mar. 5, 1996

[54] SUB-ZONE TILLER WITH OFFSET FERTILIZER PLACEMENT

[76] Inventor: David R. Primus, 5445 20th Ave., Mount Auburn, Iowa 52313

[21] Appl. No.: 213,046

[22] Filed: Mar. 15, 1994

[51] Int. Cl.⁶ ............................................. A01C 23/00
[52] U.S. Cl. .................. 111/124; 111/152; 172/730; 172/732
[58] Field of Search .................. 111/120, 123, 111/124, 125, 152, 154, 156; 172/730, 732, 733

[56] References Cited

U.S. PATENT DOCUMENTS

| | | | |
|---|---|---|---|
| 333,938 | 1/1886 | Faires | 172/733 |
| 589,025 | 8/1897 | Purnell | 172/730 |
| 1,912,477 | 6/1933 | Duffey | 172/732 |
| 2,025,844 | 12/1935 | Bakener | 172/732 |
| 2,117,461 | 5/1938 | Stemman | 172/732 |
| 2,704,499 | 3/1955 | Radway | 172/733 |
| 3,038,424 | 6/1962 | Johnson | 111/152 X |
| 3,289,772 | 12/1966 | Blackwood | 172/730 |
| 3,605,657 | 9/1971 | Brannan | 111/123 X |
| 3,863,842 | 2/1975 | McFarland et al. | 111/124 X |
| 3,919,951 | 11/1975 | Williams et al. | 111/123 |
| 4,445,445 | 5/1984 | Sterrett | 111/120 X |
| 4,583,599 | 4/1986 | Anderson | 172/730 |
| 5,001,995 | 3/1991 | Mikkelsen | 111/123 X |
| 5,005,497 | 4/1991 | Kolskog | 111/123 |

OTHER PUBLICATIONS

Farm Show, vol. 9, No. 6, 1985 p. 22.
One page containing four photographs of a winged unit by Fleischer Manufacturing Inc.
Letter dated Jan. 5, 1994 from Fleischer Manufacturing, Inc. to Edmund J. Sease.
Buffalo Ridge Runner Brochure Mar. 1985.
Advertisement for Yetter 2920 Series Deep Placement Applicator from 1993/1994 Yetter Catalog (Cover page and pp. 8–9).

*Primary Examiner*—Randolph A. Reese
*Assistant Examiner*—Victor Batson
*Attorney, Agent, or Firm*—Zarley, McKee, Thomte, Voorhees & Sease

[57] ABSTRACT

A seed furrow cutting knife adapted for cutting a seed furrow, fluffing the furrow sidewalls to avoid soil compaction, and for offset placement of fertilizer in the furrow is provided. The furrow cutting knife has associated side wings for fluffing sidewalls of the seed furrow and for simultaneous discharge of liquid fertilizer through a fertilizer tube into the seed furrow, but offset from the bottom of the seed furrow to avoid burning of the seed.

10 Claims, 5 Drawing Sheets

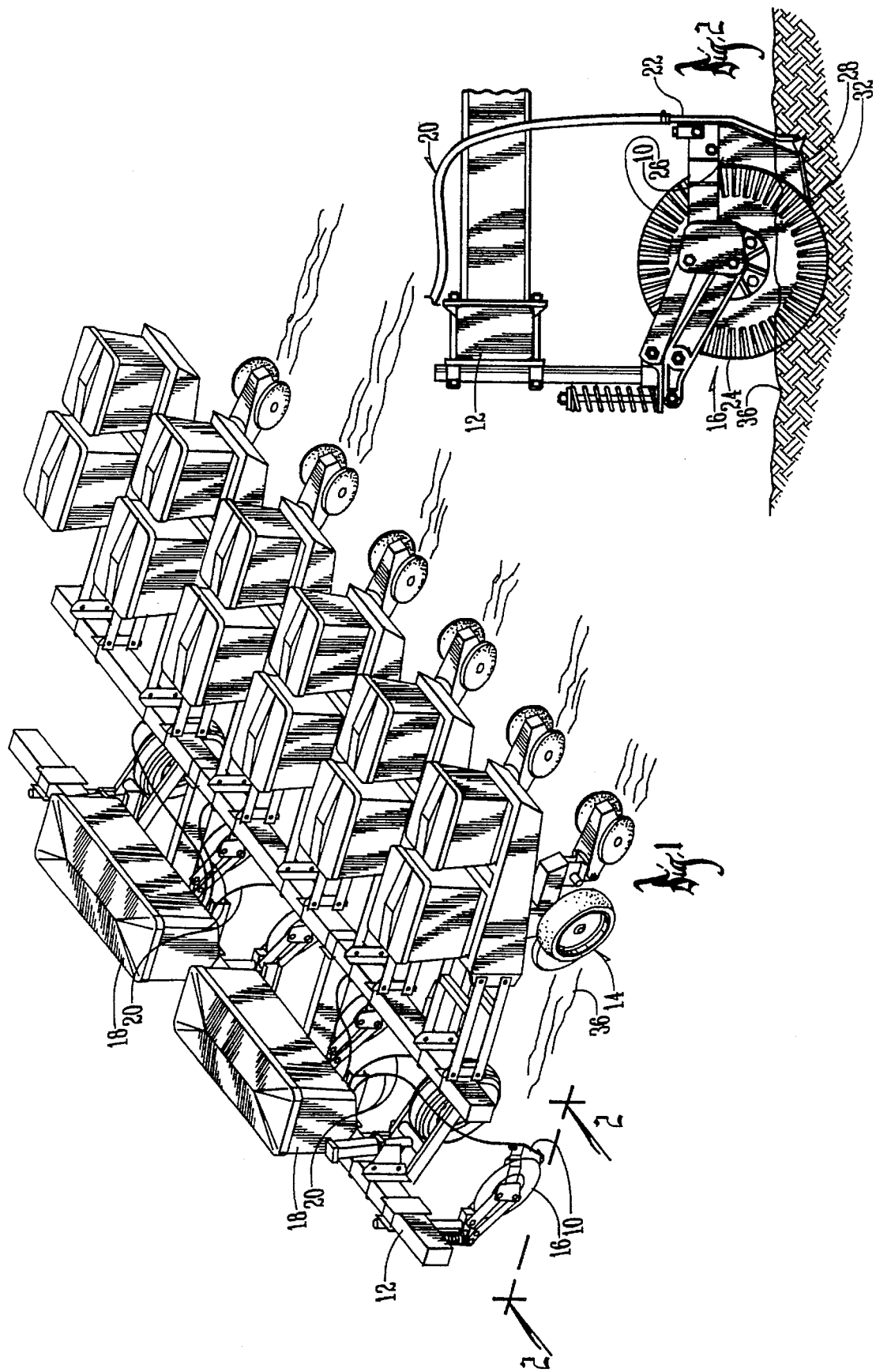

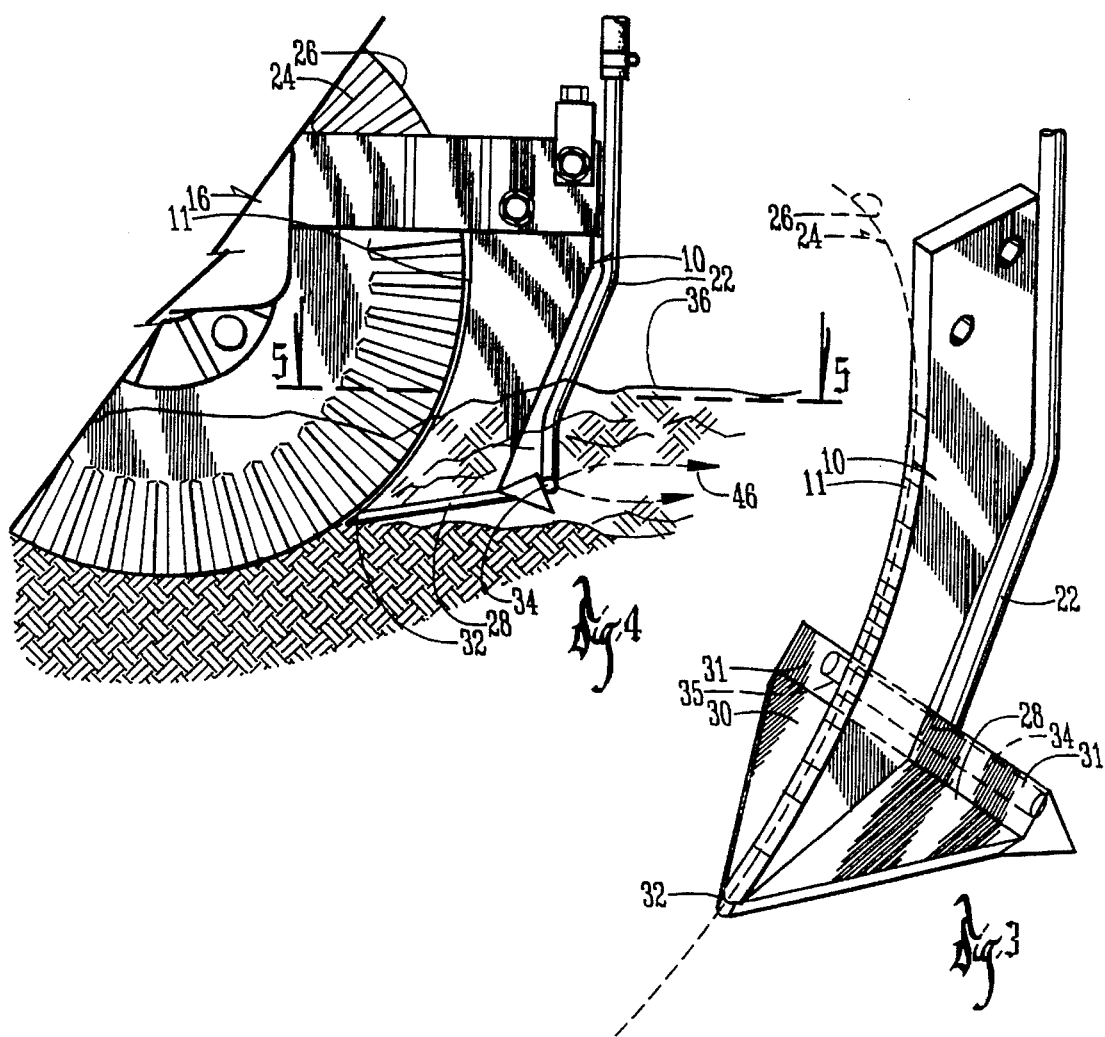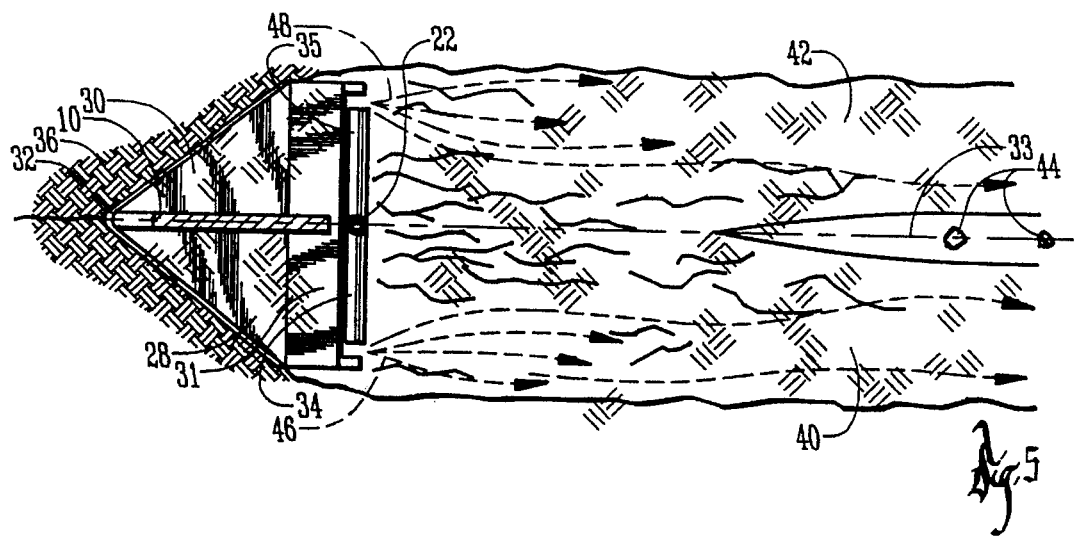

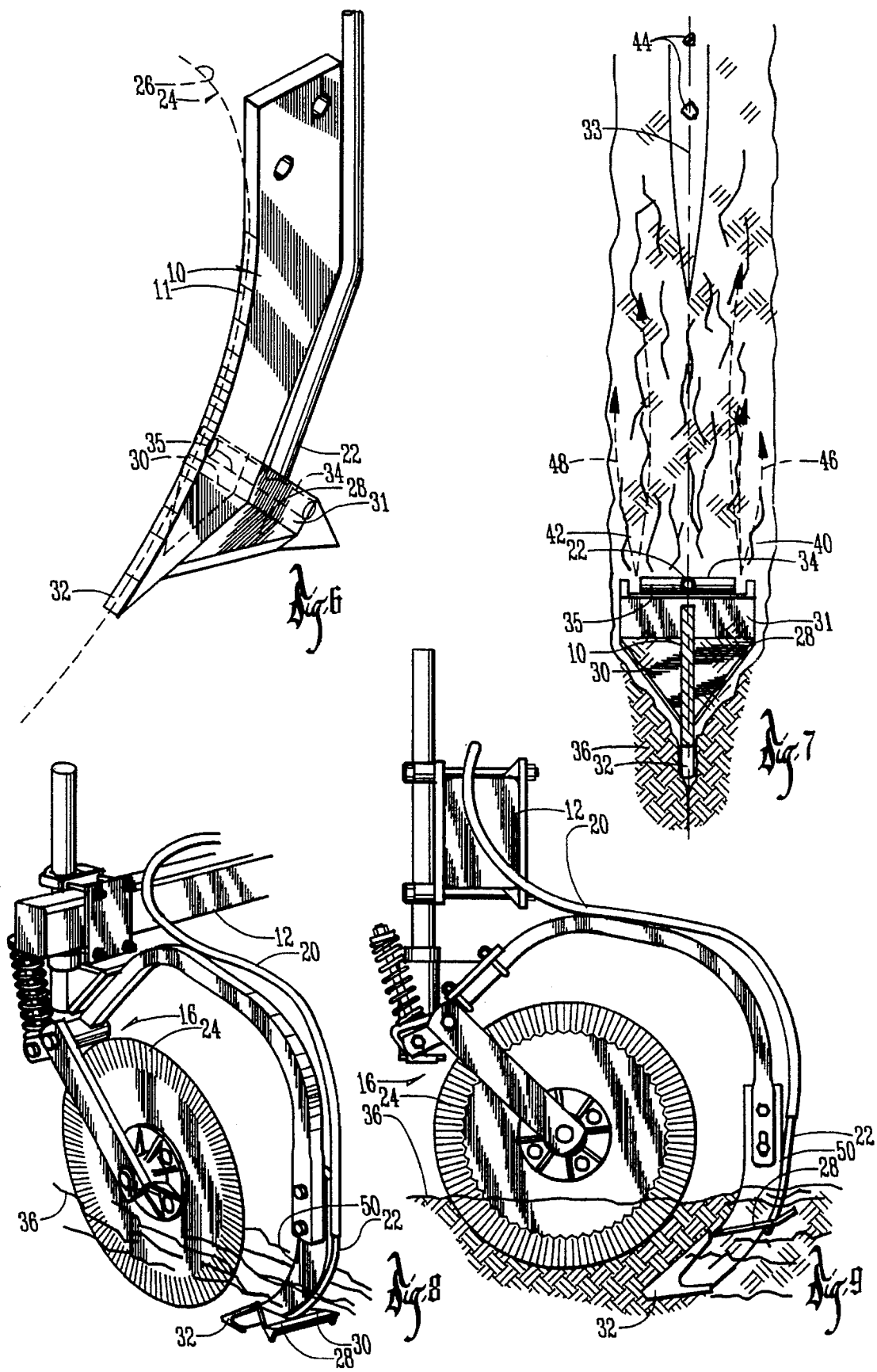

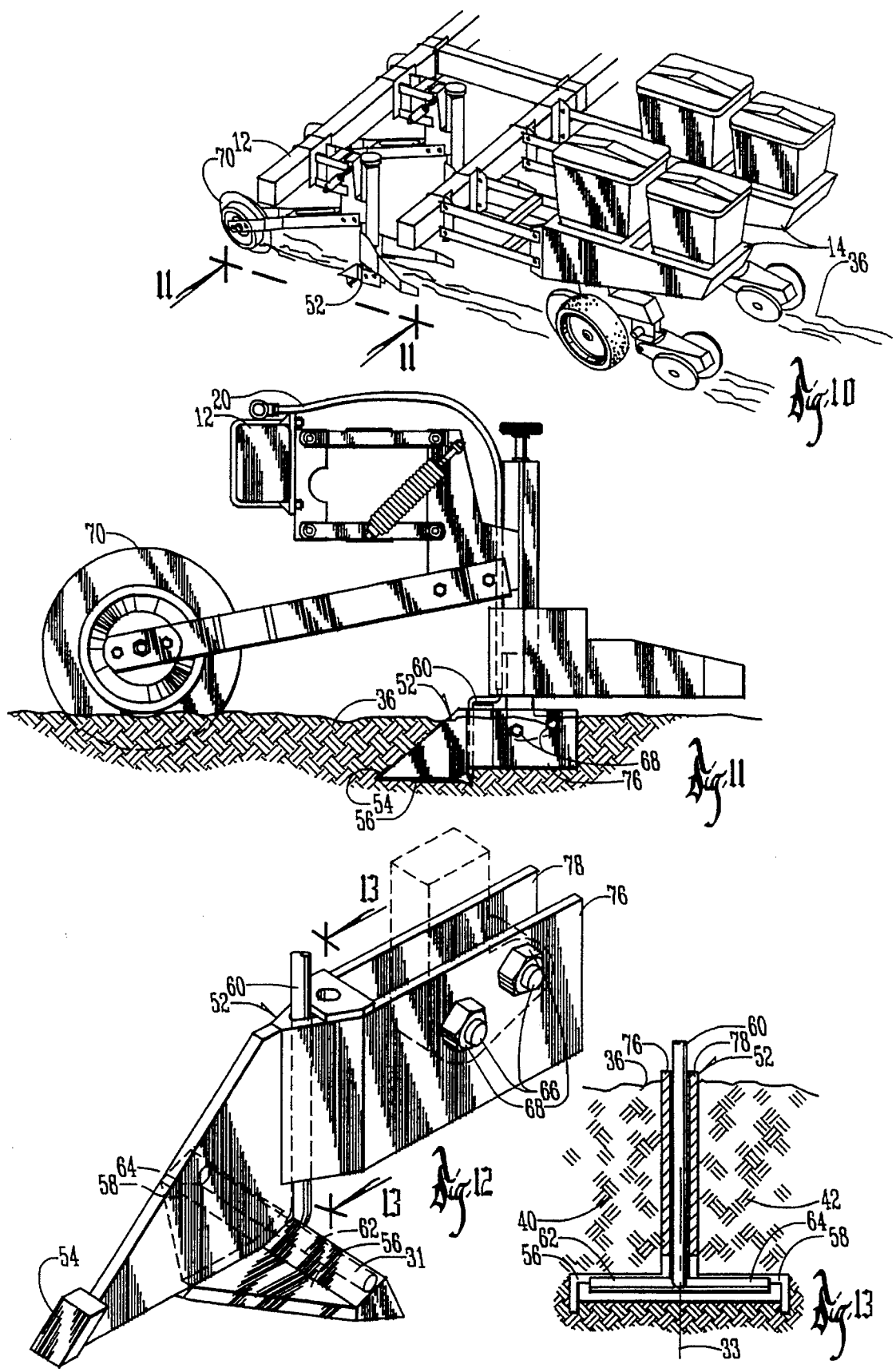

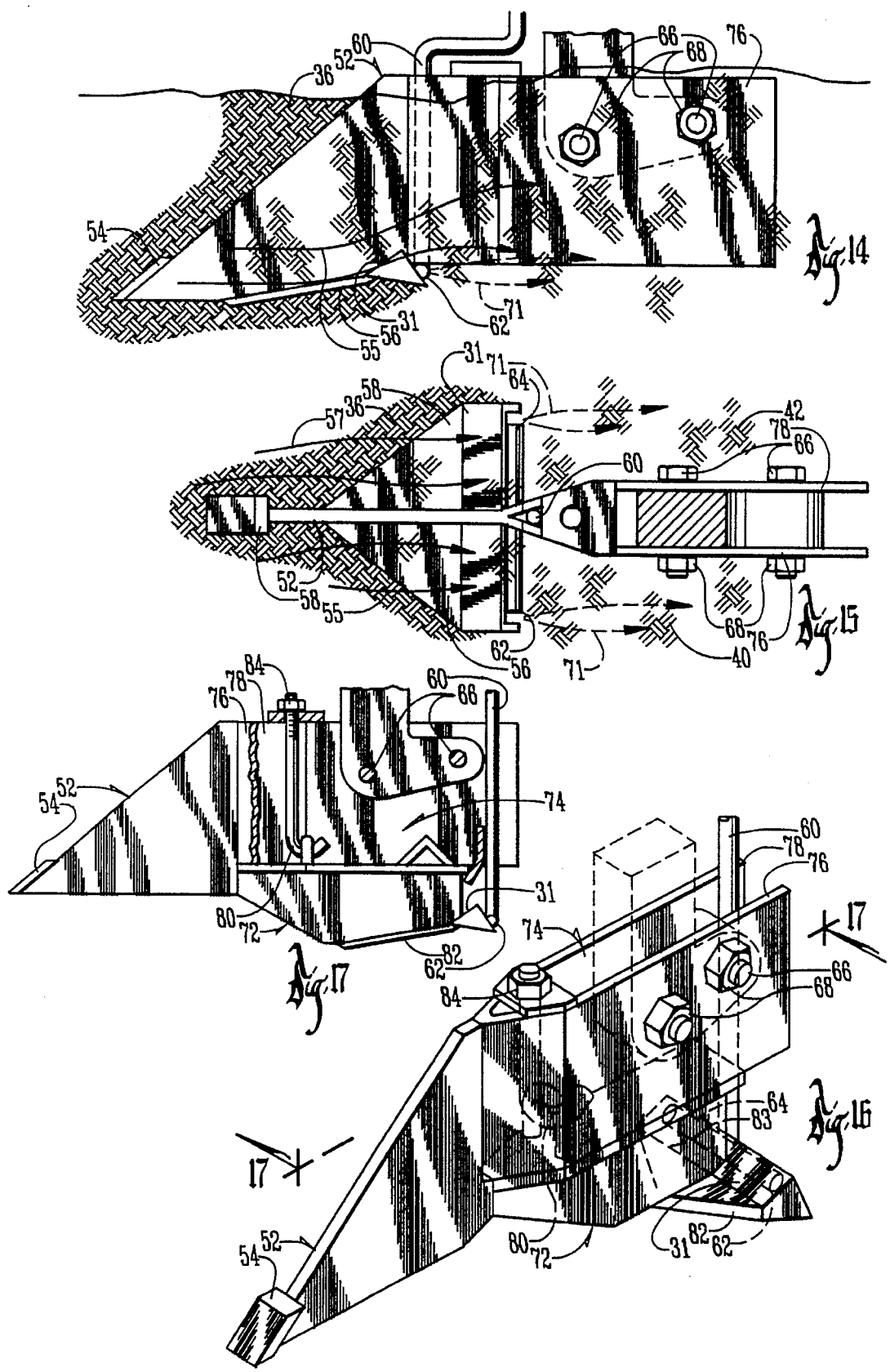

SUB-ZONE TILLER WITH OFFSET FERTILIZER PLACEMENT

BACKGROUND OF THE INVENTION

This invention relates to ground working tools and particularly to an improvement in ground working knives. These are used for opening seed furrows for planting of seed in the spring, and for fall use in fertilizer application. Cutting coulters are used in conjunction with the knife in both spring and fall. The knife is especially adaptable for no-till farming.

In recent years no tillage or minimum tillage farming has become increasingly popular for a variety of reasons. Amongst those are the savings of time, labor, fuel and energy involved with no-till farming, to say nothing of the environmental reasons such as minimized erosion, etc.

While minimum till or no-till farming has its advantages, it also provides certain specialized problems with regard to planting, namely preparation of a proper seed bed. In all planting, whether or not it is minimum tillage, it is extremely important to have good seed-to-soil contact. Good seed-to-soil contact is very important in order to have proper germination and quick starting of the seed. Poor seed-to-soil contact often comes about when the seed furrow is improperly placed in the soil. It may occur because of sidewall compaction of the seed furrow, air pockets in the seed furrow, open seed slots, and especially with no till-farming, trash pinning in the seed furrow. All of these problems, if they occur, are yield robbers.

Another problem which occurs with current seed furrow knives is that fertilizer is often discharged directly on the seed line in the bottom of the furrow. This results in liquid fertilizer such as nitrogen, potassium or phosphorus burning the kernel and damaging the hair roots of the seedling. This is undesirable in that in some instances the seed will simply not germinate, and in other instances it delays start and emergence.

Accordingly, it is a primary objective of the present invention to provide a knife which may be used with an associated coulter to provide a seed furrow that avoids compacted sidewalls, that allows discharge of fertilizer into the seed furrow but offset from the seed line, and that minimizes the risk of open seed slots and hairpinned residue.

Another objective is to provide a seed furrow which allows planting and fertilizer application in a manner which results in quicker emergence, perhaps a leaf ahead of the normal system at any given time.

Another objective of the present invention is to allow fertilizer application without using extra opening coulters.

Another objective of the present invention is to provide a knife for cutting of seed furrows which allows for simultaneous discharge into the seed furrow of fertilizer in an offset manner from the seed line. As a result, increased amounts of fertilizer can be used without fear of burning the seed and damaging hair roots of the seedling.

The method and means of accomplishing each of the above objectives as well as others will become apparent from the detailed description of the invention which follows hereinafter.

SUMMARY OF THE INVENTION

A seed furrow cutting knife adapted for cutting a seed furrow, fluffing the furrow sidewalls to avoid soil compaction of the sidewalls, and simultaneous offset placement of fertilizer in the furrow to the side of the seed. The furrow cutting knife has an associated means positioned on the cutting knife for fluffing of the sidewalls and discharge of liquid fertilizer offset from the bottom of the seed furrow. The associated means are knife wings positioned to lightly lift and fluff the soil after the cutting knife cuts the seed furrow. Each wing has an associated fertilizer discharge tube that fertilizer is discharged through into the furrow but away from its bottom and along the sidewalls of the furrow.

BRIEF DESCRIPTION OF THE DRAWINGS

FIG. 1 is an elevated perspective view of the sub-zone tiller of this invention used in conjunction with a tool bar and corn planter.

FIG. 2 is an elevated side view along line 2—2 of FIG. 1 showing the coulter and zone tiller in normal working relationship with the soil.

FIG. 3 is an elevated perspective view of the seed furrow knife and its associated wings and discharge tube.

FIG. 4 shows the knife of FIG. 3 in conjunction with a ripple coulter embedded in the soil while cutting a seed furrow.

FIG. 5 is a view of the knife and seed furrow along line 5—5 of FIG. 4.

FIG. 6 shows another version of the knife of FIG. 3 with the associated knife wings set back from the knife tip.

FIG. 7 shows the knife of FIG. 6 in conjunction with discharge of fertilizer to show the respective placement of fertilizer with regard to the seed position at the bottom of the furrow.

FIG. 8 shows another version of the knife used in conjunction with a ripple coulter as would normally be used in the fall for seed bed preparation.

FIG. 9 is a side view of the ripple coulter and knife of FIG. 8.

FIG. 10 shows a perspective view of another knife conversion useful with a knife slot opener, an opening coulter and associated seed furrow closing gauge wheels.

FIG. 11 shows the unit of FIG. 10 along line 11—11 illustrating the coulter gauge wheels and knife slot opener.

FIG. 12 shows in detail the knife slot opener with the associated wings positioned behind the slot tip.

FIG. 13 is a view of the discharge position with the knife slot opener in ground working position along line 13—13 of FIG. 12.

FIG. 14 shows the knife slot opener embedded in the soil.

FIG. 15 is a plan view of the knife slot opener of FIG. 14.

FIG. 16 shows an alternate version of the knife slot opener using an I-bar adapter.

FIG. 17 is a sectional view along line 17 of FIG. 16 showing in detail the attachment of the I-bar adapter to the knife.

DETAILED DESCRIPTION OF THE INVENTION

The knife 10 of the invention may be used with a variety of ground working implements. As illustrated in FIG. 1, the knife 10 is used with an associated tool bar 12 having a series of planters 14 and positioned forward of the planter seed furrow opening coulters 16 with associated fertilizer tank 18. Fertilizer discharges from tank 18 through lines 20 to the fertilizer discharge tube 22. In looking in detail at FIG. 2, ripple coulter of conventional construction 24 passes through the soil opening the soil initially with ripple coulter 24 being followed by seed bed knife 10. Seed bed knife 10 comprises the present invention both singly and in its associated relationship with various other ground working tools. Seed bed knife 10 follows behind ripple coulter 24 in the soil. In looking in detail at FIG. 3, knife 10 has a contoured surface 11 roughly conforming to the arc of the circular perimeter surface of ripple coulter 26. The knife creates a seed furrow. Knife 10 has associated knife wings 28 and 30. Thus knife 10 moves through the soil with its tip 32 in line with the bottom of the seed furrow along seed line 33 and associated knife wings 28 and 30, together with upwardly projecting rear portion 31, fluff the soil, the walls of the seed furrow, and assist in removing trash from the seed furrow. Knife 10 also has an associated fertilizer tube 22 through which fertilizer from fertilizer line 20 is discharged. Fertilizer passes through fertilizer tube 22 to its end and then is discharged through side discharge tubes 34, 35 fluidly connected to tube 22 into the sides of the seed furrow off center of seed line 33.

The relationship of the seed furrow, the seed and the fertilizer discharge is seen in FIG. 5. There it can be seen that the soil 36 initially is opened by the ripple coulter 24 followed in close association by knife 10. Side wings 28 and 30 open and fluff the sidewalls 40, 42 of the seed furrow. Fertilizer discharged through fertilizer discharge tube 22 passes out through side discharge tubes 34 and 35 along the sidewalls 40 and 42. The seed 44 is positioned directly in the bottom of the seed furrow, and the fertilizer as indicated by directional arrows 46 and 48 is offset along the sidewalls. In this manner the seed furrow is cut, fluffed, the sidewalls are not compacted, and the fertilizer is offset in the furrow with respect to the seed to avoid burning of the seed and damage to root hairs.

FIG. 6 shows a knife 10 of similar configuration to knife of FIG. 3 except that the side wings are back set and slightly elevated at an approximate 6° angle from the bottom of knife 10. In this manner the knife tip 32 passes through the soil after the ripple coulter 24, and the soil is lifted upward and fluffed by backset wings 28 and 30. The use of knife illustrated in FIG. 3 or FIG. 6 is at the option of the farmer.

For springtime application the knife as above described opens the seed furrow, loosens the sidewalls, leaves most of the residue in place, simultaneously drops fertilizer from two inches to six inches to the side of the seed at or below the seed level. In the fall the cutting coulter can be used to open up the seed furrow, running perhaps eight to ten inches below the surface, and leaves the residue undisturbed, yet provides a wide furrow for fertilizer application.

FIGS. 8 and 9 show a modified version, particularly useful in the fall, using a different type knife shank 50 positioned that the knife follows at a spaced apart distance behind the ripple coulter 24. It essentially operates under the same principle, though, as can be readily seen by the drawings. The difference is simply that in this instance the knife is not mounted directly behind the coulter to follow immediately the path cut by the coulter blade, but instead mounted for deeper placement of the knife and deeper penetration into the soil which is a more typical fall time application. Nevertheless, the principle remains the same.

FIGS. 10 through 16 show another embodiment of the invention involving the same principle of a furrow cutting knife with associated side wings, with the difference simply being that the knife, instead of a cutting knife of the type illustrated in FIGS. 1 through 9, is instead a knife slot opener 52. The knife slot opener 52 has a slot tip 54 and a pair of associated wings 56 and 58. Similarly, a fertilizer tube 60 has associated side discharge tubes 62 and 64. Coulter 70 opens the seed furrow with knife slot opener 52 passing through the furrow similar in fashion to the procedure earlier described for FIGS. 1–9. Bolts 66 and nuts 68 attach knife slot opener 52 to the frame of the tool bar. FIG. 14 illustrates how knife slot opener 52 passes through the soil via directional arrows 55 and 57. FIG. 15 shows via the directional arrows 71 the discharge of fertilizer onto the walls of the seed furrow.

FIGS. 16 and 17 show a slightly modified version of the knife slot opener 52 illustrated in FIG. 12. In this version the knife slot opener 52 does not have the associated wings, but rather an I-bar adapter 72 is inserted into the space 74 of U-shaped frame members 76 and 78. I-bar adapter is then bolted in with J bolt 80 and nut 84. I-bar adapter 72 holds wings 82 and 83 at a slightly upward tilt. In this manner a slightly different seed furrow is cut, but again the principle is the same with coulter followed by a knife and associated winged sidewall fluffers.

In summary, it can be seen that there is provided a knife with associated wings and fertilizer side displacement tubes such that in the spring mode it can be used to open the seed furrow, loosen the sidewalls, leave most of the residue in place, drop fertilizer about two to six inches at the side of the seed which rests in the bottom of the furrow, all without burning the seed or damaging the root hairs. In the fall a cutting coulter can be used with a deeper running knife blade to leave the residue substantially undisturbed and to provide fertilizer deposited at the side of the furrow. It therefore can be seen that the invention accomplished at least all of its stated objectives.

What is claimed is:

1. A seed furrow cutting knife adapted for cutting a seed furrow fluffing the furrow sidewalls to avoid soil compaction, and for offset placement of fertilizer in the furrow to the side of the seed adjacent the furrow sidewalls, comprising:

a furrow cutting knife for cutting a seed furrow to have a bottom and sidewalls, said cutting knife having a pair of knife wings for fluffing said furrow sidewalls and means for discharge of liquid fertilizer offset from the bottom of said seed furrow but in said furrow adjacent or on the sidewalls; and wherein said pair of knife wings are disposed on each side of said knife, said pair of knife wings being substantially flat along the surface of the wings and having a leading and a trailing edge, said trailing edge being substantially straight and perpendicular to the path of travel of the knife, said trailing edge having a flat upwardly projecting rear portion, and wherein said knife wings each have a wing tip formed at the outer portion of the knife wing and being parallel to the remainder of the knife wing.

2. The cutting knife of claim 1 wherein the knife is a knife slot opener having an associated frame member.

3. The cutting knife of claim 2 wherein the knife slot opener has a knife slot tip.

4. The cutting knife of claim 3 wherein the knife slot opener has an associated fertilizer discharge tube, and an offset discharge tube fluidly connected thereto, for discharge of fertilizer adjacent each wing of said knife.

5. The knife of claim 4 wherein said wings are tilted rearwardly and upwardly.

6. The cutting knife of claim 1 wherein the means for discharge of liquid fertilizer is a discharge tube with a fluidly connected offset tube for each knife wing.

7. The cutting knife of claim 1 wherein said knife is an arch shaped knife having an arcuate contour matching the contour of a coulter.

8. The cutting knife of claim 1 wherein said knife wings are set at an upward angle with respect to the lower most surface of said knife.

9. The knife of claim 2 wherein said knife is releasably clamped to said associated frame member.

10. A tiller for offset placement of a liquid comprising:

a furrow cutting knife adapted for cutting a seed furrow having a bottom and sidewalls;

a pair of knife wings coupled to the cutting knife, said wings being substantially flat and disposed generally parallel to a ground surface, said wings having a trailing edge substantially perpendicular to the path of travel of the furrow cutting knife, said trailing edge including a flat upwardly projecting rear portion; and a pair of liquid discharge tubes each in communication with a source of liquid, said tubes adapted to discharge said liquid behind said upwardly projecting rear portion and proximate said trailing edge of